US006539301B1

(12) United States Patent
Shirk et al.

(10) Patent No.: US 6,539,301 B1
(45) Date of Patent: Mar. 25, 2003

(54) SYSTEM AND METHOD FOR CONTROLLING A VEHICLE EMERGENCY RESPONSE NETWORK

(75) Inventors: Michael E. Shirk, Northville, MI (US); Jim Piwowarski, Holly, MI (US); Mark Malinowski, Farmington Hills, MI (US); Pat Findling, Lake Orion, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 1044 days.

(21) Appl. No.: 08/691,663

(22) Filed: Aug. 2, 1996

(51) Int. Cl.[7] ................................................ G01C 21/34

(52) U.S. Cl. ....................................................... 701/200

(58) Field of Search ................................ 701/207, 209, 701/211, 213, 200; 340/902, 904, 991, 993; 342/357, 457

(56) References Cited

U.S. PATENT DOCUMENTS

| | | | | | |
|---|---|---|---|---|---|
| 5,223,844 | A | * | 6/1993 | Mansell et al. | 342/357 |
| 5,274,358 | A | | 12/1993 | Janis | 340/574 |
| 5,305,370 | A | * | 4/1994 | Kearns et al. | 379/45 |
| 5,334,974 | A | | 8/1994 | Simms et al. | 340/990 |
| 5,572,204 | A | * | 11/1996 | Timm et al. | 340/988 |
| 5,579,443 | A | * | 11/1996 | Tatematsu et al. | 455/521 |
| 5,649,059 | A | * | 7/1997 | Tendler et al. | 340/988 |
| 5,686,886 | A | | 11/1997 | Stensney | 340/539 |
| 5,701,232 | A | * | 12/1997 | Tang et al. | 361/683 |
| 5,742,666 | A | * | 4/1998 | Alpert | 455/404 |
| 5,808,564 | A | * | 9/1998 | Simms et al. | 340/990 |

* cited by examiner

*Primary Examiner*—Tan Q. Nguyen
(74) *Attorney, Agent, or Firm*—Carlson, Gaskey & Olds

(57) ABSTRACT

A vehicle assistance request system includes a device and methodology for preventing inadvertent or mistaken assistance request calls. The system enables a vehicle driver to request roadside assistance with a single push of a button on a user interface module inside the vehicle or a remote, portable key fob. The data communication signal that is generated when the button is pushed communicates location information and the type of assistance that is needed to a dispatcher of the appropriate services. The system includes a timer function that requires that a user press a request button for a minimum time period before a request is initiated. Also provided is a protective shield, which further ensures that a request button is not pushed inadvertently.

15 Claims, 2 Drawing Sheets

SYSTEM AND METHOD FOR CONTROLLING A VEHICLE EMERGENCY RESPONSE NETWORK

BACKGROUND OF THE INVENTION

This invention generally relates to a system for requesting roadside assistance from a vehicle at any location. More specifically, this invention relates to a system and method for controlling the activation of a roadside assistance request system.

The widespread use of cellular telephones has provided advantages to vehicle owners in that they are able to place telephone calls from their vehicle. This can be especially advantageous in the event that roadside assistance is needed. Under such circumstances, however, the caller must be able to describe where they are and what type of assistance is required. Systems have been developed that utilize cellular telephone communication networks and are specifically designed for requesting roadside service from a vehicle.

Existing systems have several shortcomings and drawbacks, however. For example, in various emergency situations, cellular telephone or other mobile communication networks may be unreliable, unavailable or prohibitively expensive. Further, the increased popularity of cellular telephones tends to cause cellular networks to become congested, which may interfere with placing a timely emergency request. Another disadvantage associated with existing systems is that they do not provide sufficient control systems to avoid inadvertent, inaccurate or mistaken assistance requests.

This invention provides a system that avoids the shortcomings and drawbacks of the prior art. A system designed according to this invention activates a vehicle assistance request upon the push of a single button. Upon activation, the location of the vehicle, vehicle speed and direction information, vehicle identification, and the type of assistance requested is transmitted through a mobile data communications network to a dedicated monitoring center for handling such requests. Once a request signal is received at the monitoring center, vehicle coordinates, which are determined through a global positioning system, are converted to the closest street address and nearest intersections to the vehicle location. After the vehicle location, vehicle identification, subscriber information and the type of assistance requested is determined, an operator dispatches the appropriate service provider. Since the service is requested through the push of a single button, it is important to provide a system and methodology for minimizing inadvertent or mistaken service requests.

SUMMARY OF THE INVENTION

In general terms, the method associated with this invention for controlling a vehicle assistance request system that has a transmitter for transmitting a data communication request signal from a vehicle location to a monitoring center remote from the vehicle includes four basic steps. First, a request signal is generated at the vehicle location that indicates that an assistance request should be initiated. The request signal is generated by pressing an activation button on an operator interface module, which can be mounted inside the vehicle or can be a remote key fob. The amount of time that the button is pressed is determined, which corresponds to the amount of time that the request signal is generated. Next, a determination is made whether the amount of time that the request signal is generated is at least as long as a pre-selected minimum time period. Then, an assistance request is initiated at the remote location when the amount of time that the request signal is generated is at least as long as the pre-selected time period. An assistance request is terminated when the amount of time that the request signal is generated at the vehicle location is less than the pre-selected minimum time period.

One embodiment for operating a vehicle assistance request system designed according to this invention includes a housing that is supported on the vehicle. The housing preferably is located in the passenger compartment of the vehicle where it is easily accessed by the driver of the vehicle. A plurality of activation buttons are supported on the housing for activating the transmitter to transmit a request signal from the vehicle to a remote location. Each of the activation buttons has a unique, designated request function. A moveable cover that is movably supported on the housing is moveable between a first position where the cover prevents the activation buttons from being pressed and a second position where the cover is away from the buttons such that they can be pressed by a user of the system. A timer times an amount of time that any of the activation buttons are pressed. A communication link between the activation buttons and the transmitter includes a controller that controls whether the transmitter transmits a signal based upon the amount of time determined by the timer. The transmitter only transmits a request signal when one of the activation buttons has been continuously pressed for a minimum amount of time.

In the preferred embodiment, the moveable cover is a clear plastic plate that is supported on the housing and is slidable between the position where it covers the buttons and where the buttons are exposed. Also in the preferred embodiment, the controller controls the transmitter such that it transmits a request signal only when one of the activation buttons has been continuously pressed for at least three seconds.

In another embodiment, an assistance request button is incorporated into a remote key entry member, or key fob. Now a user can request emergency assistance from outside the vehicle, preferably, a minimum activation time is also used with the key fob.

The various features and advantages of this invention will become apparent to those skilled in the art from the following detailed description of the presently preferred embodiment. The drawings that accompany the detailed description can be described as follows:

DETAILED DESCRIPTION OF THE PREFERRED EMBODIMENT

Figure 1:
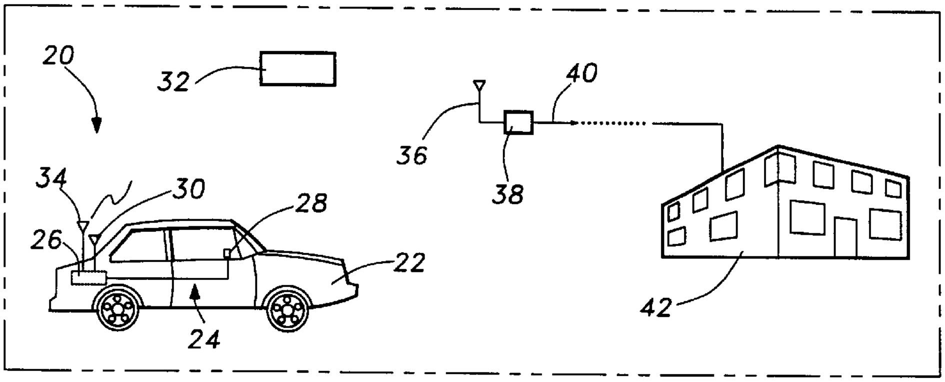
FIG. 1 is a schematic illustration of a vehicle assistance request system.

FIG. 1 schematically illustrates a vehicle roadside assistance request system or emergency response network 20. A vehicle 22 includes an onboard assistance request system 24. The request system 24 includes a controller unit 26 and an operator interface module 28. The operator interface module 28 preferably is located within the passenger compartment of the vehicle such that it is easily accessed by the driver of the vehicle. The control unit 26 includes a computer that handles all signal processing at the vehicle location as will become apparent in the following description.

An antenna 30 facilitates communication of the system 24 with a global positioning network 32. A variety of global positioning technologies are available and operative, and can be accessed by a system designed according to this invention. State of the art global positioning system technologies generally have excellent availability and location accuracy capabilities. Typical global positioning systems can provide vehicle location information to an accuracy within 100 meters of the actual location 95% of the time and within 300 meters 100% of the time. Vehicle location typically is determined within 40 meters of the actual location. A system designed according to this invention preferably includes averaging and screening algorithms that utilize and enhance the raw global positioning system data.

Another antenna 34 is utilized to transmit and receive data communication signals, which preferably are in a Mobitex format, to a remotely located antenna 36 that is coupled to a Mobitex tower 38. Significantly, this signal transmission is distinct from and does not rely on cellular telephone communication networks. The Mobitex tower 38 is connected through dedicated transmission lines 40 to a request monitoring center 42. The request monitoring center 42 includes appropriate devices for facilitating the handling of various service requests and enabling operators to dispatch the appropriate roadside service.

Figure 2:
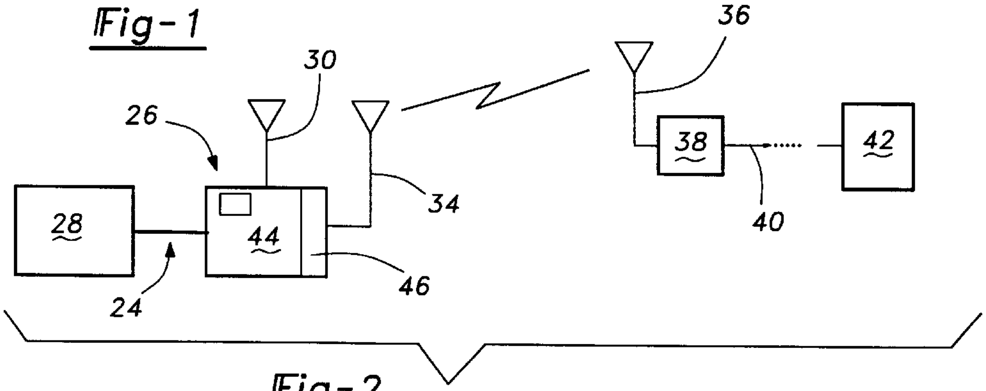
FIG. 2 is a schematic illustration of selected components of a vehicle assistance request system.

FIG. 2 schematically illustrates selected components of the system 20. The controller 26 of the vehicle assistance request system 24 is schematically divided into two portions. A main processing unit or control system module 44 includes electronics that provide power conditioning, power management and integration logic for communications with the global positioning system, the Mobitex communications and the operator interface module 28. The control unit 44 processes, for example, the information obtained through the global positioning network 32 and the desired service request sought by the user through the operator interface module 28.

A Mobitex transceiver 46 is coupled with the control unit 44. The Mobitex transceiver 46 can be a commercially available unit. The Mobitex transceiver 46 is primarily responsible for transmitting a data communication link signal to the Mobitex tower 38 where it is then transferred on to the request monitoring center 42. The transceiver 46 also receives signals sent from the request monitoring center 42.

Figure 3A:
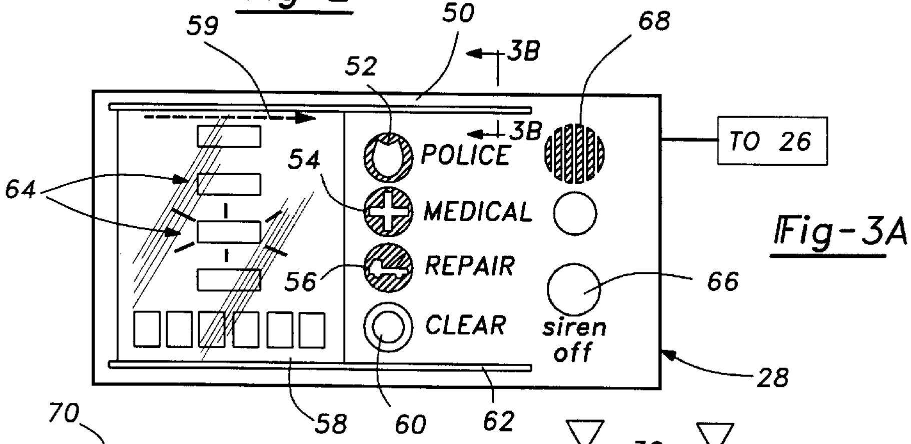
FIG. 3A is a diagrammatic illustration of an operator interface module designed according to this invention.
Figure 5:
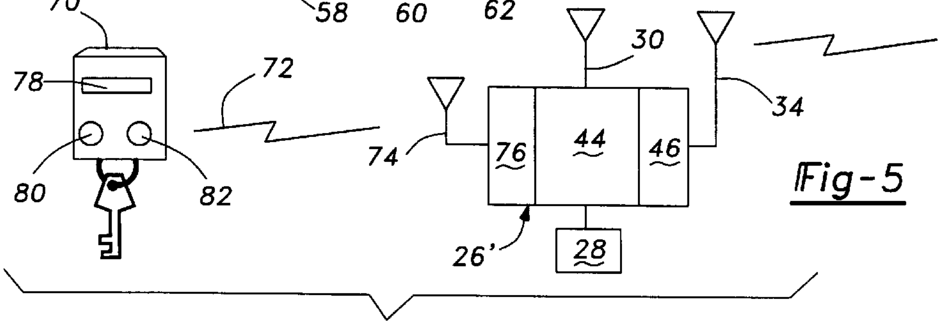
FIG. 5 is a schematic illustration of an embodiment of this invention including a remote activation button.

FIG. 3A diagrammatically illustrates an operator interface module 28 designed according to this invention. The module 28 includes a housing 50 that preferably is mounted within the vehicle passenger compartment in a position where it is readily accessible by the driver of the vehicle. A plurality of activation buttons 52, 54 and 56 are provided to enable a user of the system to press a single button to initiate a vehicle assistance request. Each of the buttons has a dedicated assistance request function associated with it. In the illustrated example, the button 52 initiates a police assistance request, the button 54 initiates a medical assistance request and the button 56 initiates a roadside repair or tow truck service request. The button 60 provides a clear function for clearing or cancelling a previously sent request.

Figures 3B, 4:
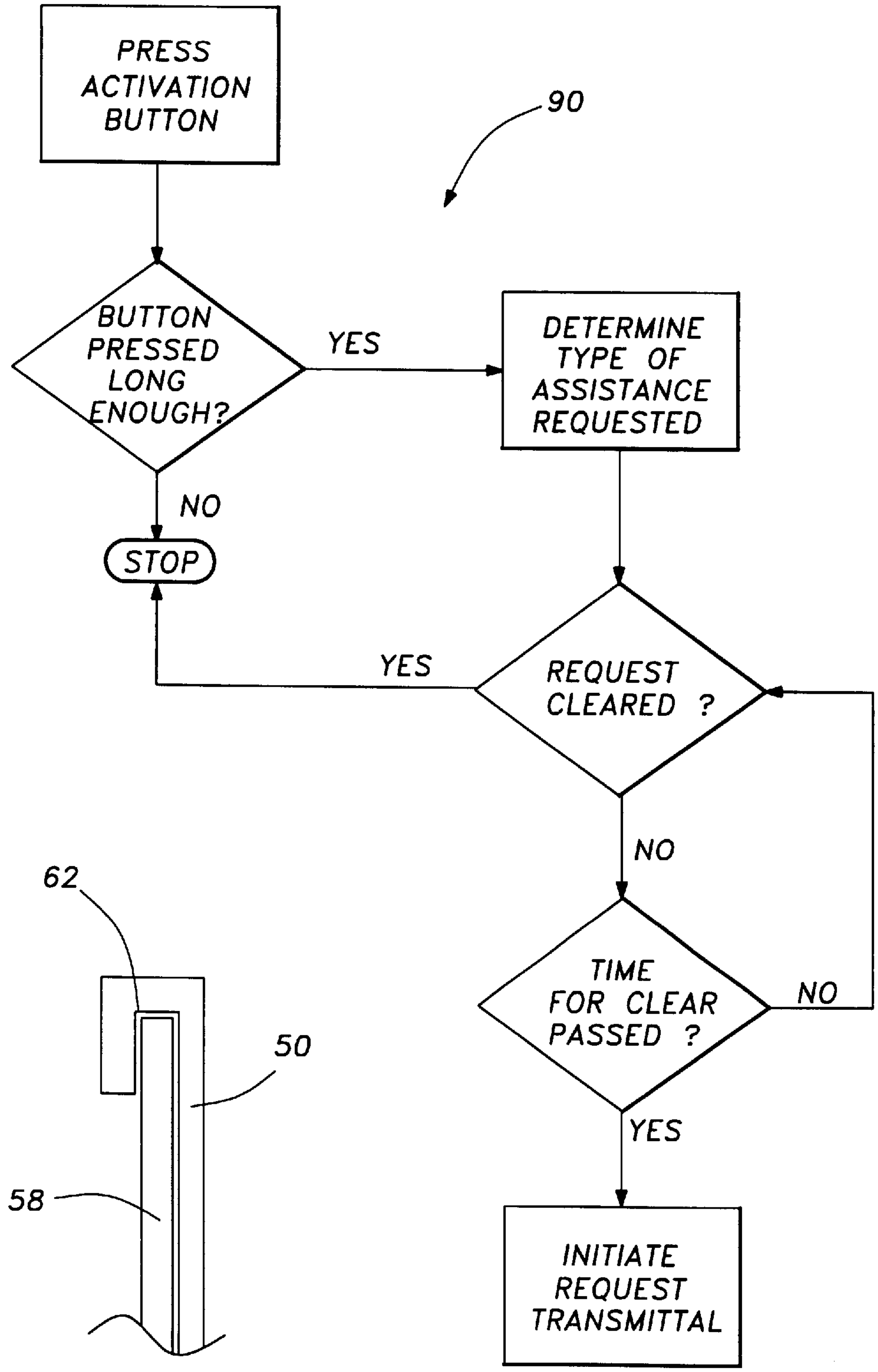
FIG. 3B is a cross-sectional view along line 3B—3B of FIG. 3A.
FIG. 4 is a flow chart diagram illustrating the method associated with this invention.

Since a request is sent from the vehicle to the remotely located request monitoring center 52 upon pressing a single button, it is important to provide a way of avoiding inadvertent service requests or mistaken service requests. Accordingly, a system designed according to this invention most preferably includes a cover 58 that is mounted onto the housing 50 such that it is slidable in the direction of the arrow 59. The cover 58 preferably is slidable between a first position where it covers the buttons 52, 54 and 56 and a second position where the buttons are accessible by a user. In the preferred embodiment, the cover 58 is made from a clear plastic material such that the buttons and status lights are visible even when the cover is placed over them. The cover 58 preferably is mounted onto the housing 50 through slots 62 so that it can be moved from side to side (according to the drawing) between the position where it protects the buttons from being pressed and the position where the buttons are accessible. The slots 62 are best shown in FIG. 3B.

The operator interface module 28 preferably also includes light emitting diodes 64, which could be other indicator devices, to indicate the various functions and status of the system 24. The system preferably also includes a siren for emitting audible warning signals and an operating button 66, which enables a user to turn off the siren at any given time. A speaker 68 preferably is also provided in order to enable the user to receive audible signals via the operator interface module 28.

In addition to the cover 58, the system 24 preferably includes electronic hardware or computer software that prevents inadvertent assistance request signals from being sent. According to the presently most preferred embodiment, in order to initiate an assistance request, one of the buttons 52, 54 or 56 must be pressed and held for a minimum of three consecutive seconds. A timer unit, which is preferably a portion of the controller 44, monitors the amount of time that the activation buttons are pressed. If the activation button is not pressed for the minimum amount of time, then no assistance request signal is transmitted by the transceiver 46.

It is important to note that the terms "timer" and "timer unit" as used in this specification refer generically to a hardware or software implementation of the timing feature. In the presently most preferred embodiment, the monitoring of whether an activation button has been appropriately pushed is accomplished through software programming of the controller 44. Those skilled in the art will understand how to develop appropriate code, given this specification.

To further reduce the incidence of undesirable requests being made, a clear button 60 is provided. If a user has sent a request signal inadvertently, within a pre-selected amount of time after sending that signal, it is possible to clear or cancel the request. This is accomplished by pressing the clear button 60 and holding it in The key fob 70 preferably includes three activation buttons. A first button 78 enables the user to lock or unlock the doors of the vehicle and to activate or deactivate a vehicle security system, for example. An assistance request activation button 80 is provided that, when pressed for at least three continuous seconds, will initiate a police assistance request through the system 24. The key fob preferably includes dedicated electronics or software to determine whether the button 80 is pressed long enough. Once that determination is made, the key fob sends an RF signal to the receiver 76.

The key fob provides a significant advantage in allowing a person to call for immediate police assistance even if they are not inside the vehicle. A clear function button 82 preferably is also provided on the key fob 70 to enable a user to clear an accidental call that may have been made. The clear button 82 preferably must be held for a minimum of three seconds before a request cancellation will be initiated. Also, a clear function preferably is only initiated when the clear button is appropriately pressed within a pre-selected time period from the time that the request is made.

The press and hold function of a system designed according to this invention is effective to minimize the occurrence of inadvertent or mistaken vehicle assistance requests. Further, the movable cover 58 provides additional assurance in preventing accidental requests from being made through the operator interface module 28.

The foregoing description is exemplary rather than limiting in nature. Variations and modifications to the disclosed embodiment will become apparent to those skilled in the art that do not depart from the purview and spirit of this invention. Accordingly, the scope of this invention is to be determined only by studying the appended claims.

What is claimed is:

1. A method of controlling a vehicle assistance request system having a transmitter for transmitting a data communication request signal from a vehicle location to a distant location remote from the vehicle location and a hand-held user fob portable relative to the vehicle location that includes a button for generating the request signal, (A) generating a request signal indicating that an assistance request should be initiated by pressing the button on the fob and generating the request signal for an amount of time that corresponds to an amount of time that the button is pressed;

(B) determining an amount of time that the request signal is generated;

(C) determining whether the amount of time from step (B) is at least as long as a preselected time period;

(D) initiating an assistance request from the vehicle location when the amount of time from step (B) is at least as long as the preselected time period of step (C);

(E) receiving the assistance request at the distant location remote from the vehicle location; and (F) at the distant location, dispatching assistance to the vehicle location based upon said step (E).

2. The method of claim 1, wherein the request signal is generated by pressing one of the plurality of buttons and wherein step (B) is performed by determining an amount of time that the button is being continuously pressed and wherein step (C) is performed by comparing the amount of time that the button is being continuously pressed to the preselected time period.

3. The method of claim 2, wherein the preselected time period of step (C) is three seconds.

4. The method of claim 1, further comprising the steps of determining whether a second signal indicative of a desire to cancel a request has been generated within a preselected time after performing step (D) and terminating an assistance request when the second signal has been produced within the preselected time.

5. The method of claim 1 wherein said steps (B) and (C) are performed by the fob.

6. A device for operating a vehicle assistance request system having a transmitter for transmitting a request signal from a vehicle location to a remote location, comprising:

a housing supported on the vehicle;

a plurality of activation buttons supported on said housing for activating the transmitter, each said activation button having a designated request function;

a moveable clear cover that is movably supported on said housing and is moveable into a first position where said cover prevents said buttons from being pressed and a second position where said cover is clear of said buttons;

a communication link between said activation buttons and the transmitter, said communication link including a controller that controls whether the transmitter transmits a request signal based upon activation of at least one of said activation buttons; and a plurality of indicators associated with said activation buttons for visually indicating an operation status of each of said buttons, said plurality of indicators visible through said clear cover.

7. The device of claim 6, wherein said cover comprises a plate that is movably supported on said housing to be moved between said first and second positions.

8. The device of claim 7, wherein said activation buttons are visible but not tactibly accessible when said cover is in said first position.

9. The device of claim 6, further comprising a plurality of indicators for visually indicating an operation condition of the transmitter.

10. The device of claim 6, wherein the designated request functions associated with said activation buttons include a police assistance request function, a medical assistance request function and a vehicle repair assistance request function.

11. The device of claim 6, further comprising a remote activation fob portable relative to said housing, said fob including an activation button that operates to activate the transmitter to initiate the request function when said fob activation button is continuously pressed for said minimum amount of time.

12. The device of claim 6, further including a timer for timing an amount of time that any of said plurality of buttons is pressed, wherein said controller controls whether the transmitter transmits a request signal based upon the amount of time determined by said timer and wherein the transmitter only transmits a request signal when at least one of said activation buttons has been continuously pressed for a minimum amount of time.

13. A vehicle assistance request system, comprising:

a transmitter that is supported on the vehicle for transmitting a data communication assistance request to a remote location;

a controller supported on the vehicle for controlling said transmitter, and a remote activation module portable relative to said controller and said transmitter, said remote activation module having an activation button for sending a wireless signal to said controller indicating to said controller that an assistance request should be sent by said transmitter, said controller including a tuner that measures an amount of time that said activation button is pressed by a user, said controller sending said assistance request via said transmitter based upon receipt of said wireless signal from said remote activation module only when said button is continuously pressed by a user for at least a preselected amount of time.

14. The system of claim 13, further comprising a user interface module supported on the vehicle and having a plurality of activation buttons that are each associated with a dedicated assistance request function and wherein said timer determines an amount of time that an activation button is continuously pressed and said controller initiates an assistance request only when said button is continuously pressed for at least a preselected amount of time.

15. The system of claim 14, wherein one of said plurality of activation buttons is associated with a dedicated assistance request function that is the same as that associated with said remote activation module activation button.

* * * * *